Figure 1:
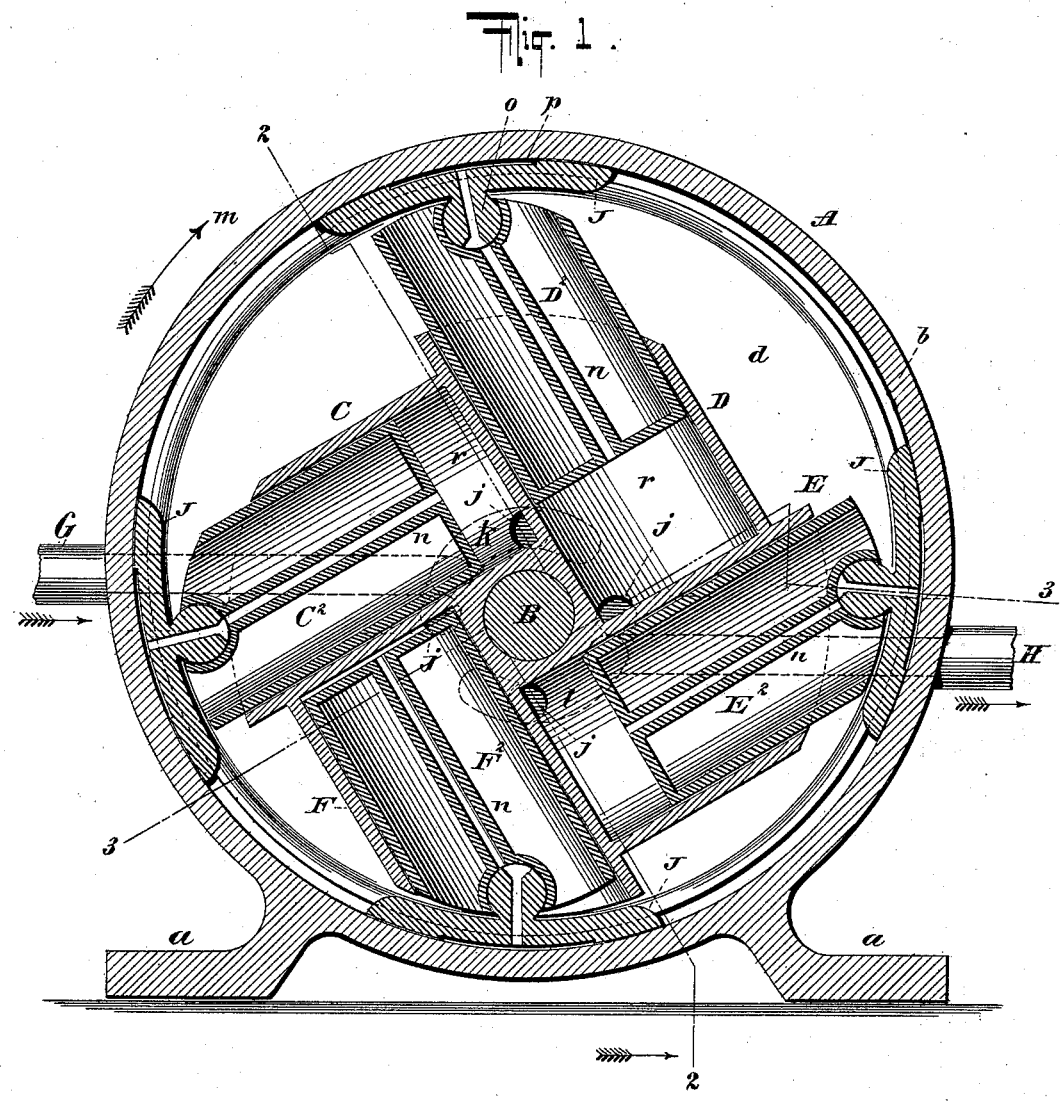

(No Model.)  3 Sheets—Sheet 1.
T. R. ALMOND.
ROTARY ENGINE.

No. 580,838. Patented Apr. 20, 1897.

WITNESSES
Gustave Dieterich.
L. M. Wachschlager.

INVENTOR
Thomas R. Almond
BY Briesen & Knauth
ATTORNEYS.

(No Model.) 3 Sheets—Sheet 2.
T. R. ALMOND.
ROTARY ENGINE.
No. 580,838. Patented Apr. 20, 1897.
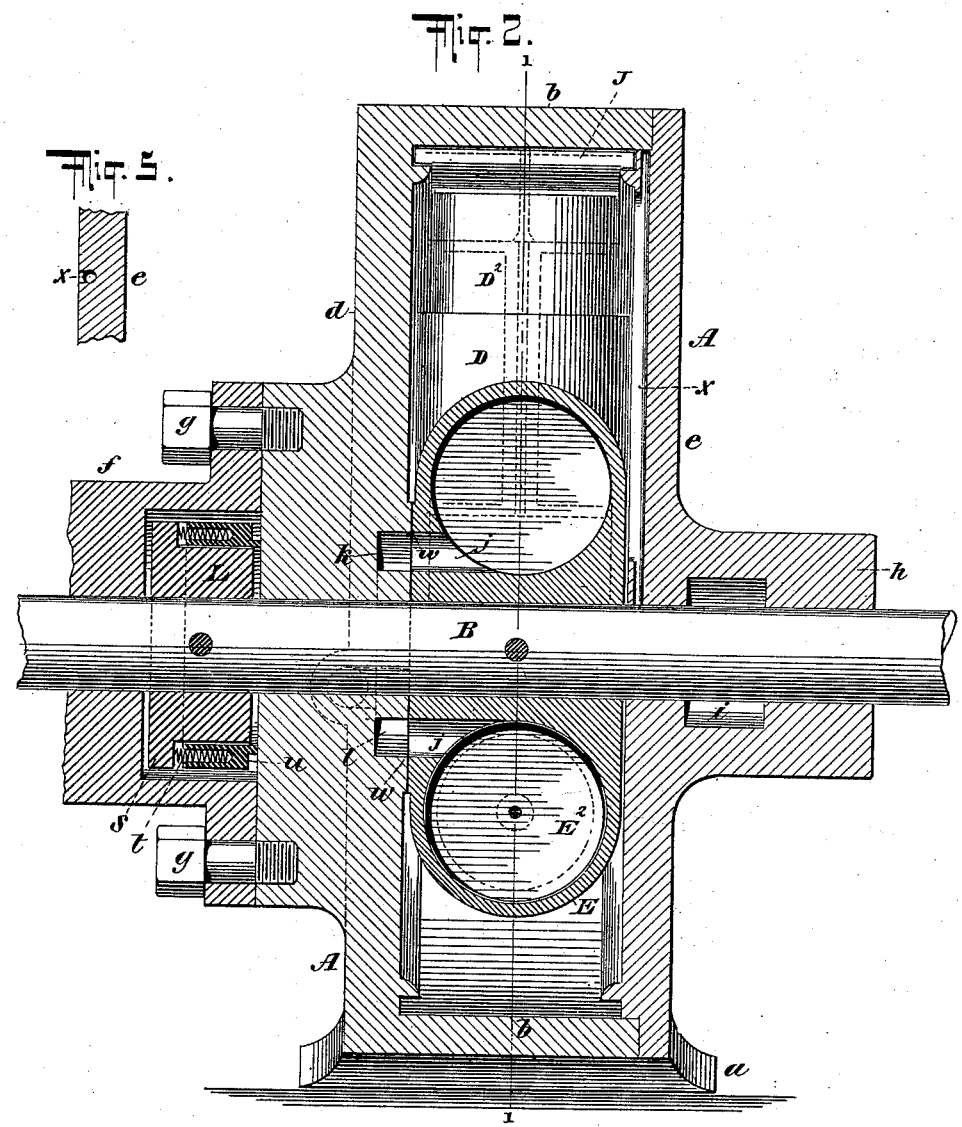
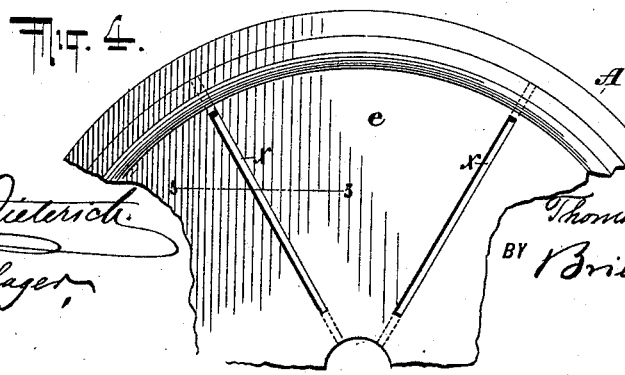
WITNESSES
Gustave Dieterich
L. M. Wachschlager
INVENTOR
Thomas R. Almond
BY Briesen & Knauth
ATTORNEYS.

(No Model.) 3 Sheets—Sheet 3.
T. R. ALMOND.
ROTARY ENGINE.
No. 580,838. Patented Apr. 20, 1897.
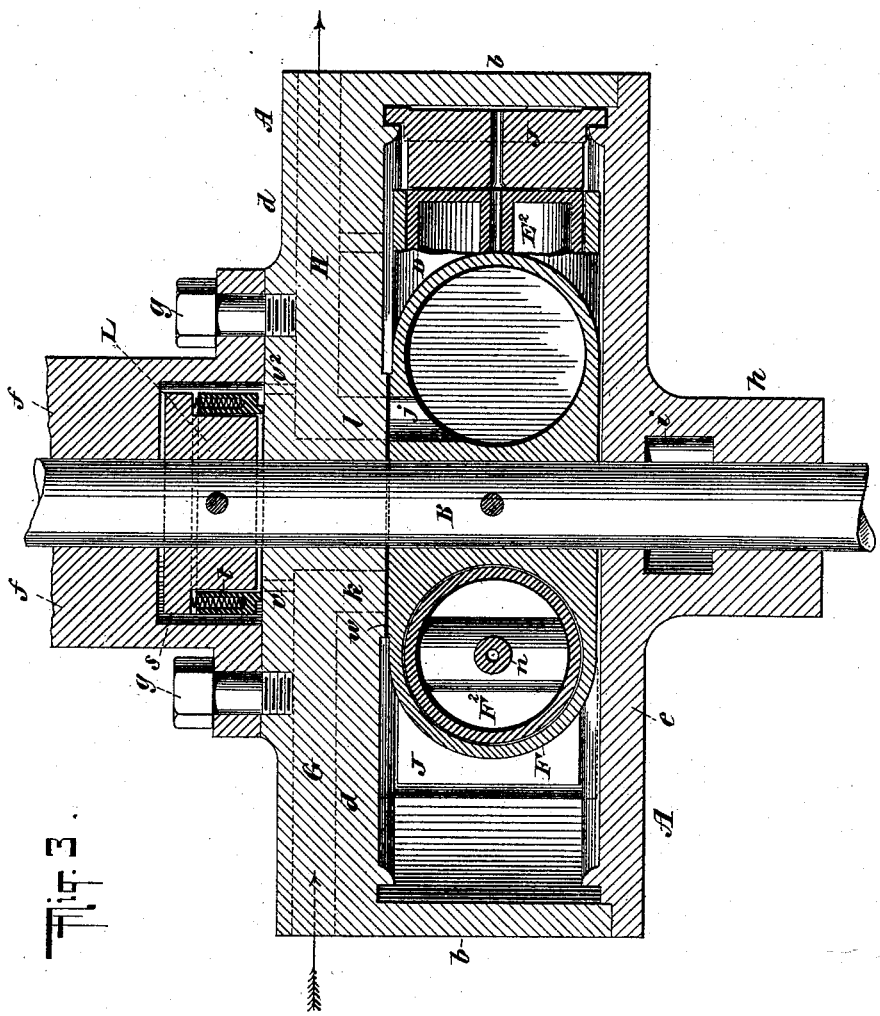

UNITED STATES PATENT OFFICE.

THOMAS R. ALMOND, OF DUNWOODIE HEIGHTS, NEW YORK.

ROTARY ENGINE.

SPECIFICATION forming part of Letters Patent No. 580,838, dated April 20, 1897.

Application filed November 7, 1896. Serial No. 611,351. (No model.)

*To all whom it may concern:*

Be it known that I, THOMAS R. ALMOND, a subject of the Queen of England, residing at Dunwoodie Heights, Westchester county, State of New York, have invented certain new and useful Improvements in Rotary Engines, of which the following is a specification, reference being had to the accompanying drawings, forming part hereof, in which—

Figure 1 represents a vertical transverse section of my improved rotary engine, the line 1 1 in Fig. 2 indicating the plane of section. Fig. 2 is practically a vertical longitudinal section on the plane of the line 2 2, Fig. 1. Fig. 3 is a substantially horizontal section of the engine on the plane of the line 3 3, Fig. 1. Fig. 4 is a detail inner face view of a part of one head of the engine-case; and Fig. 5 is a small detail cross-section on the line 5 5, Fig. 4.

This invention relates to certain improvements on that class of rotary engines in which tangential cylinders carried by a shaft and provided with outwardly-movable pistons are contained within an eccentric casing or housing.

The invention consists, first, in providing each of said outwardly-movable pistons with a pivoted shoe which is adapted to contact with the inner face of the eccentric housing, and which is perforated for the admission of steam or other active expansive fluid to a space between said shoe and said housing. The object of this improvement is to avoid friction between said shoe and said eccentric housing at the time the piston which carries the shoe is pressed outwardly.

The invention consists, secondly, in combining the main shaft of the engine, where the same is provided with a collar on the outer side of the case or housing, with a cushioned contact-ring which is pressed against the outer wall of the case or housing, and with means for admitting steam to the space between the collar that is embraced by said spring-pressed ring and the external face of the housing. The object of this improvement is to insure a steam-tight contact between the head or body of the engine and the external housing at the place or along those faces where steam is admitted, thereby preventing steam from entering those parts of the engine to which it is not intended that it should be admitted.

The invention consists, thirdly, in providing a hub of the stationary casing where it embraces the rotating shaft with an annular space around said shaft, in which space water and oil may accumulate for lubricating purposes.

Finally, the invention consists in providing the head or end wall of the casing on its inner side with substantially radial grooves for the purpose of carrying any oil which may come in contact with said head toward the central part of the engine, where it will exert its best effect for lubricating purposes.

In the accompanying drawings, the letter A represents the housing or shell of my rotary engine. This housing is stationary, being provided with suitable feet or flanges $a$, whereby it can be safely secured in a stationary position to a support of suitable kind. The housing proper, A, is of cylindrical form, consisting of the circular rim $b$ and of the two heads $d$ and $e$. B is a shaft carried eccentrically on said housing A and so supported as to be free to rotate within bearings provided in said housing and within suitable other bearings, which may be provided for the purpose. The bearings provided by the housing, as represented in Figs. 2 and 3, are, first, those contained in the head $d$, those contained in a cap $f$, which is bolted to the outer face of said head $d$ at $g$, as shown in Fig. 3, and, secondly, in an extension-hub $h$, which is formed on the outer side of the head $e$. Within this extension-hub $h$ is formed an annular chamber $i$, which embraces the shaft B and which serves to collect any water or oil that may leak outwardly along the shaft B, holding it as a lubricating means in position on the shaft.

To the shaft B is rigidly secured within the shell or housing A the head proper of the engine. This head proper consists of four (more or less) tangentially-arranged cylinders C, D, E, and F, each provided with a piston $C^2$, $D^2$, $E^2$, and $F^2$. The outer end of each of said cylinders is open to allow the piston which it carries to protrude, as shown. The inner end of each cylinder has a port for the admission and exhaust of the steam or analogous operative fluid. These different ports in the cylinders are indicated at $j$ in the drawings. Steam is admitted by a pipe G to an inlet-port $k$, formed in the head $d$. Steam is exhausted through the pipe H from an outlet-port $l$, which is also formed in the head $d$. The inlet-port $k$ is of such length (see the dotted lines in Fig. 1) as to allow the cylinder F, as soon as it moves from about the position shown in Fig. 1 in the direction of the arrow $m$ in said figure, to receive steam and to continue so to receive steam until it reaches a position represented by the cylinders D, Fig. 1. The outlet-port is of such size and extent as to allow a cylinder to exhaust when it reaches about the position of D and to continue so to do until it reaches nearly the position of the cylinder F in the same figure.

It will be observed that each of the pistons $C^2$, $D^2$, $E^2$, and $F^2$ carries on a tubular central stem $n$ a pivoted shoe J. This pivoted shoe has a steam-passage $o$ in its pivotal portion, which steam-passage communicates with a space $p$, which is formed between the shoe and the cylindrical shell $b$ of the housing A. The tube $n$ within each piston is open to the steam-space $r$ in the inner portion of the corresponding cylinder. It follows that while steam is admitted to a cylinder such steam also passes through the tubular stem $n$ and shoe-passage $o$ into the confined space $p$ on the outer side of each shoe, forming a cushion which counteracts the outward pressure of the steam on the piston, thus avoiding friction.

It has heretofore been proposed to supply pistons of this character on the outer portions with antifriction-rollers, but experience has shown that such rollers, even if effective as antifrictional devices to some extent, yet are incapable of balancing the outward pressure of the steam against the pistons, and, moreover, they produce so much noise as to render their employment very objectionable. By my improved arrangement of shoe with outer steam chamber or cushion all these objections are overcome. Of course when a piston in my engine is in communication with the exhaust there is no further outward pressure against such piston, and consequently the confined space $p$ may also be brought in communication with the exhaust without injury to the operation of the parts. I have shown the shoes J socketed in enlargements of the tubular stems $n$, and I regard this as one of the most effective means for the purpose; but other means for pivoting the shoes and supplying steam thereto or of supplying steam to the space between said shoes and the shell may be substituted for the preferred means which I have shown without departing from the spirit of my invention.

Within the cap $f$ the shaft B carries a collar L, which is rigidly secured to it, the cap $f$ being suitably hollowed for the purpose. This collar L has an outer enlargement at $s$ to form a shoulder against which springs $t$ or analogous cushions are adapted to press, said springs holding a loose ring $u$ close against the outer surface of the stationary head $d$. Steam is admitted through a passage $v$ (see dotted lines in Fig. 3) to the space formed between the collar L, the movable ring $u$, the head $d$, and the shaft B. The movable spring-pressed ring $u$ confines this steam in that space and causes it to force the collar L as far as feasible away from the stationary head $d$. The collar L being rigidly secured to the shaft B, it follows that this action of the steam tends to move the shaft B and with it the engine-head within the case or housing toward the head $d$, thereby making a tight joint at $w$, where steam is admitted, and preventing any steam from leaking into the space around the head of the engine. The space within the cap $f$, which surrounds the collar L and the ring $u$, should communicate with the exhaust, as at $v^2$, or with the outer air.

In order to collect for lubricating purposes any of the water or oil that may be admitted into the engine and distribute the same where most needed, I have grooved the inner face of the head $e$, (and may apply similar grooving to the inner face of the head $d$,) as shown at $x$ in Figs. 4 and 5. These grooves are inclined, as shown, and may most appropriately be produced by drilling into the head from the outer edge, as indicated in Fig. 2, and then cutting into the drilled hole to the inner face of the head as far as necessary to produce the required crease or groove. Any oil or water reaching the head will in these grooves be conducted toward the shaft B, and thence reach the chamber $i$.

What I claim, and desire to secure by Letters Patent, is—

1. In a rotary engine, having stationary case or housing A and tangential cylinders C, D, E, &c., the combination of said cylinders with their respective pistons $C^2$, $D^2$, $E^2$, &c., and with shoes J pivoted to said pistons, and with a steam-passage to and through each shoe, as and for the purpose described.

2. The combination of the cylinder C with the piston $C^2$, tube $n$ carried by said piston, shoe J pivoted to said tube, steam-conduit $o$ within said shoe, steam-chamber $p$ on the outer side of said shoe, and with the stationary shell $b$, all as and for the purpose described.

3. The combination in a rotary engine of outwardly-movable pistons with shoes pivoted thereto, means substantially as described for admitting steam to and exhausting steam from chambers formed in said shoes, and with the outer shell $b$ against which said shoes are pressed by steam admitted to the engine, as and for the purpose described.

4. The combination of the stationary casing A with the shaft B supported by said casing, with the engine-body carried on said shaft within said casing, with the collar L carried on said shaft outside of said casing within a hollow cap $f$ and with the cushioned ring $u$ and steam-inlet $v$, all arranged to hold the engine-body in close contact with the head of the casing, substantially as and for the purpose described.

5. The stationary head $e$ provided on its inner side with substantially radiating inclined grooves $x$, in combination with the shaft B from which said grooves radiate and to which they directly extend, as and for the purpose described.

6. The combination of the housing A having inner radiating inclined groove or grooves $x$, with the shaft B supported in said housing and with the hub $h$ formed on said housing and having the chamber $i$ around the shaft, said chamber being open on its inner side only, all arranged to conduct to and collect in said chamber $i$ water and oil flowing in the groove or grooves $x$, as specified.

THOMAS R. ALMOND.

Witnesses:
FRITZ V. BRIESEN,
MAURICE BLOCK.